US008799574B2

(12) United States Patent
Corda

(10) Patent No.: US 8,799,574 B2
(45) Date of Patent: Aug. 5, 2014

(54) METHOD AND DEVICES FOR INSTALLING AND RETRIEVING LINKED MIFARE APPLICATIONS

(75) Inventor: Alexandre Corda, Nice (FR)

(73) Assignee: NXP, B.V., Eindhoven (NL)

( * ) Notice: Subject to any disclaimer, the term of this patent is extended or adjusted under 35 U.S.C. 154(b) by 739 days.

(21) Appl. No.: 12/921,422

(22) PCT Filed: Mar. 9, 2009

(86) PCT No.: PCT/IB2009/050981
§ 371 (c)(1),
(2), (4) Date: Dec. 7, 2010

(87) PCT Pub. No.: WO2009/113017
PCT Pub. Date: Sep. 17, 2009

(65) Prior Publication Data
US 2011/0072203 A1   Mar. 24, 2011

(30) Foreign Application Priority Data
Mar. 10, 2008  (EP) ..................................... 08290227

(51) Int. Cl.
*G06F 13/00* (2006.01)
*G06F 3/06* (2006.01)
*G06F 12/06* (2006.01)
*G06F 13/12* (2006.01)

(52) U.S. Cl.
CPC ............ *G06F 3/0628* (2013.01); *G06F 3/0631* (2013.01); *G06F 12/06* (2013.01); *G06F 12/0646* (2013.01); *G06F 13/12* (2013.01)
USPC ............ 711/115; 711/152; 711/173; 711/217

(58) Field of Classification Search
CPC ..... G06F 3/0628; G06F 3/0631; G06F 12/06; G06F 12/0646; G06F 13/12
USPC .................................. 711/115, 152, 173, 217
See application file for complete search history.

(56) References Cited

U.S. PATENT DOCUMENTS

| 6,986,458 B2 | 1/2006 | Flugge et al. |
| 7,865,141 B2 | 1/2011 | Liao et al. |

(Continued)

FOREIGN PATENT DOCUMENTS

| CN | 101000620 A | 7/2007 |
| EP | 1248188 A1 | 9/2002 |

(Continued)

OTHER PUBLICATIONS

"Mifare Standard Card IC MF1 IC S50 Functional Specification—Revision 4.0" Philips Semiconductors, 18 pgs, retrieved from the internet at: www.synometrix.com/MF1_%20S501_Data_Sheet.pdf (Jul. 1998).

(Continued)

*Primary Examiner* — Reba I Elmore

(57) ABSTRACT

A method for installing linked MIFARE applications (TK1-A, TK1-B, TK1-C) in a MIFARE memory (MM) being configured as a MIFARE Classic card or an emulated MIFARE Classic memory comprises storing the first linked MIFARE application (TK1-A) in a first free sector of the MIFARE memory, storing the second linked MIFARE application (TK1-B) in a second free sector of the MIFARE memory and writing link information (LK) indicating this second sector in a link information memory location of the first sector where first linked MIFARE application (TK1-A) has been stored, and repeating the steps of storing linked MIFARE applications and writing link information (LK) until the last linked MIFARE application (TK1-C) has been stored.

9 Claims, 2 Drawing Sheets

(56) References Cited

U.S. PATENT DOCUMENTS

| | | |
|---|---|---|
| 7,967,215 B2 | 6/2011 | Kumar et al. |
| 8,116,678 B2 | 2/2012 | Johnson, Jr. et al. |
| 8,118,218 B2 | 2/2012 | Koh et al. |
| 8,391,837 B2 | 3/2013 | Corda |
| 2002/0089890 A1 | 7/2002 | Fibranz et al. |
| 2004/0042112 A1 | 3/2004 | Stence et al. |
| 2004/0164142 A1* | 8/2004 | Flugge et al. .................. 235/380 |
| 2005/0079863 A1 | 4/2005 | Macaluso |
| 2005/0138148 A1 | 6/2005 | Ronen et al. |
| 2007/0180098 A1 | 8/2007 | Matsuo |
| 2007/0293155 A1 | 12/2007 | Liao et al. |
| 2008/0073426 A1 | 3/2008 | Koh et al. |
| 2008/0306849 A1 | 12/2008 | Johnson, Jr. et al. |
| 2009/0003577 A1 | 1/2009 | Chin et al. |
| 2009/0023476 A1 | 1/2009 | Saarisalo et al. |
| 2009/0103124 A1 | 4/2009 | Kimura et al. |
| 2009/0199206 A1 | 8/2009 | Finkenzeller et al. |
| 2009/0261172 A1 | 10/2009 | Kumar et al. |
| 2009/0291634 A1* | 11/2009 | Saarisalo ..................... 455/41.1 |
| 2010/0027798 A1 | 2/2010 | Back |
| 2010/0093396 A1 | 4/2010 | Roundtree |

FOREIGN PATENT DOCUMENTS

| | | |
|---|---|---|
| EP | 1770533 A1 | 4/2007 |
| WO | 0116759 A1 | 3/2001 |
| WO | 2006092504 A1 | 9/2006 |
| WO | 2007144149 A2 | 12/2007 |
| WO | 2008014800 A1 | 2/2008 |

OTHER PUBLICATIONS

Finkenzeller, K. "RFID Handbook: Fundamentals and Applications in Contactless Smart Cards and Identification—Second Edition", John Wiley & Sons Ltd., 434 pgs (2003) (*equivalent to RFID Handbuch $3^{rd}$ Edition*, 2002).

NXP; "MF1ICS50 Functional SPEC"; (Dec. 14, 2009).

Anonymous; "Mobile NFC Technical Guidelines, Version 2.0"; Internet Citation http://www.gsmworld.com/documents/nfc/gsma_nfc2_wp.pdf.

International Search Report for Application PCT/IB2009/050981 (Mar. 9, 2009).

GSM Association; "Pay-Buy-Mobile Business Opportunity Analysis"' Public White Paper, version 1.0; 36 pgs.; http://www.gsmworld.com/documents/gsma_nfc_tech_guide_vs1.pdf; Nov. 1, 2007.

GSMA; "Mobile NFC Services"; URL:http://www.gsmworld.com/documents/nfc_services_0207.pdf; pp. 1-24; Feb. 1, 2007.

International Search Report, PCT/IB2009/052008, May 14, 2009.

\* cited by examiner

Fig. 1
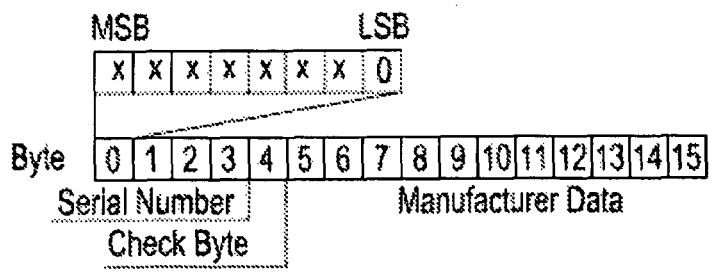
Fig. 2
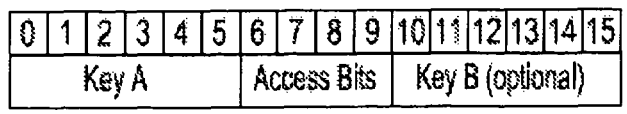
Fig. 3

METHOD AND DEVICES FOR INSTALLING AND RETRIEVING LINKED MIFARE APPLICATIONS

FIELD OF THE INVENTION

The invention relates to a method for installing linked MIFARE applications in a MIFARE memory being configured as a MIFARE Classic card or an emulated MIFARE Classic memory.

The invention further relates to a computer program product directly loadable into the memory of a mobile communication device being equipped with a MIFARE device.

The invention further relates to a mobile communication device that comprises a classic or emulated MIFARE memory.

The invention further relates to a MIFARE memory device.

The invention further relates to a trusted service manager being configured to transmit linked MIFARE applications and link information values via an Over-The-Air interface to a mobile communication device that is equipped with a MIFARE memory.

The invention further relates to a reader device for retrieving MIFARE applications from a MIFARE memory.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998) which is herein incorporated by reference. MIFARE® technology is also discussed in: Klaus Finkenzeller, "RFID Handbuch", HANSER, $3^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1k offers about 768 bytes of data storage, split into 16 sectors with 4 blocks of 16 bytes each (one block consists of 16 bytes); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1 k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

Recently, mobile communication devices have been developed which contain MIFARE devices, either being configured as MIFARE Classic cards or as MIFARE emulation devices like SmartMX cards. These mobile communication devices comprise e.g. mobile phones with Near Field Communication (NFC) capabilities, but are not limited to mobile phones.

MIFARE as a card or in a mobile communication device (SmartMX for example) can be used for multi-applications purposes. I.e. it is possible to install several tickets, coupons, access controls and so on in one MIFARE memory. Usually, in order to allow a very fast access RFID/NFC readers access one specific MIFARE sector for retrieving a specific application. This fast access is needed for instance at stadium gates, transit areas and so on. So, for a particular event, a reader will try to access a specific sector to find the corresponding ticket.

Problems arise when a user wants to buy several tickets for the same event. These tickets may have different prices (adult, kids, different categories). The ticket issuer will send these tickets to the user's mobile communication device. The problem is that the readers (e.g. at the stadium gate) are programmed to look for the ticket at one specific location (sector) in the MIAFRE memory of the mobile communication device. In practice the user will have to swipe his mobile communication device a first time in order to enable the reader to find the ticket. After the reader has found the first ticket the user must manually (by pressing some keys on his mobile communication device) swap the first ticket by the next one. This manual operation lasts very long and is not acceptable e.g. at stadium gates, because such a delay will cause long queues at the gates.

OBJECT AND SUMMARY OF THE INVENTION

It is an object of the invention to provide a solution to the above mentioned problems.

In order to achieve the object defined above, with a method according to the invention characteristic features are provided so that a method according to the invention can be characterized in the way defined below, that is:

A method for installing linked MIFARE applications in a MIFARE memory being configured as a MIFARE Classic card or an emulated MIFARE Classic memory, the method comprising storing the first linked MIFARE application in a first free sector of the MIFARE memory, storing the second linked MIFARE application in a second free sector of the MIFARE memory and writing link information indicating this second sector in a link information memory location of the first sector where first linked MIFARE application) has been stored, and repeating the steps of storing linked MIFARE applications and writing link information until the last linked MIFARE application has been stored.

In order to achieve the object defined above, a computer program product being directly loadable into the memory of a mobile communication device with a MIFARE memory being configured as a MIFARE Classic card or an emulated MIFARE Classic memory comprises software code portions for performing—when running on the mobile communication device—the steps of the method for installing a mobile communication device according to the above paragraph.

In order to achieve the object defined above, a mobile communication device according to the invention comprises an arithmetic-logic unit and a memory and processes the computer program product according to the above paragraph.

In order to achieve the object defined above, with a MIFARE memory device according to the invention characteristic features are provided so that such a MIFARE memory device can be characterized in the way defined below, that is:

A MIFARE memory device being configured as a MIFARE Classic card or an emulated MIFARE Classic memory, comprising in each of its sectors link information memory locations dedicated to being written with link information that indicates another sector where a linked MIFARE application is installed.

In order to achieve the object defined above, with a trusted service manager according to the invention characteristic features are provided so that a trusted service manager according to the invention can be characterized in the way defined below, that is:

A trusted service manager being configured to transmit linked MIFARE applications and link information values via an Over-The-Air interface to a mobile communication device that is equipped with a MIFARE memory being configured as a MIFARE Classic card or an emulated MIFARE Classic memory, wherein the trusted service manager is adapted to instruct the mobile communication device on basis of the transmitted linked MIFARE applications and link information values to store the first linked MIFARE application in a first free sector of the MIFARE memory, to store the second linked MIFARE application in a second free sector of the MIFARE memory and to write link information indicating this second sector in a link information memory location of the sector where first linked MIFARE application has been stored, and to repeat the steps of storing linked MIFARE applications and writing link information until the last linked MIFARE application has been stored.

In order to achieve the object defined above, with a reader device according to the invention characteristic features are provided so that a reader device according to the invention can be characterized in the way defined below, that is:

A reader device for retrieving MIFARE applications from a MIFARE memory that is configured as a MIFARE Classic card or an emulated MIFARE Classic memory, wherein the reader is configured to read a first MIFARE application from a first sector of the MIFARE memory, which first sector is optionally a predefined sector, reading link information from the same sector, if the link information points to another sector of the MIFARE memory reading the MIFARE application being stored in this another sector, and repeating the steps of reading MIFARE applications and link information until the link information points to an empty or invalid sector or contains a stop instruction or points to a sector that has already been read. The characteristic features according to the invention provide the advantage that linked MIFARE applications can be installed in multiple sectors of a MIFARE memory and a reader will be able to retrieve them all although it might expect to find such MIFARE applications only in one particular sector of the MIFARE memory. A further advantage of the present invention is that a user does not need to manually interfere in order to support the reader in the retrieving process. Therefore, highest retrieving speed can be achieved.

In order to extend the present invention to random access reader devices it is suggested that link information is written in a link information memory location of that sector of the MIFARE memory where the last linked MIFARE application has been stored, wherein this link information indicates a sector where the first linked MIFARE application (TK1-A) has been stored.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

FIG. 1 shows the memory organization of a MIFARE Standard 1k EEPROM.

FIG. 2 shows the manufacturer block of a MIFARE memory.

FIG. 3 shows the sector trailer of a sector of MIFARE memory.

DESCRIPTION OF EMBODIMENTS

Figure 4:
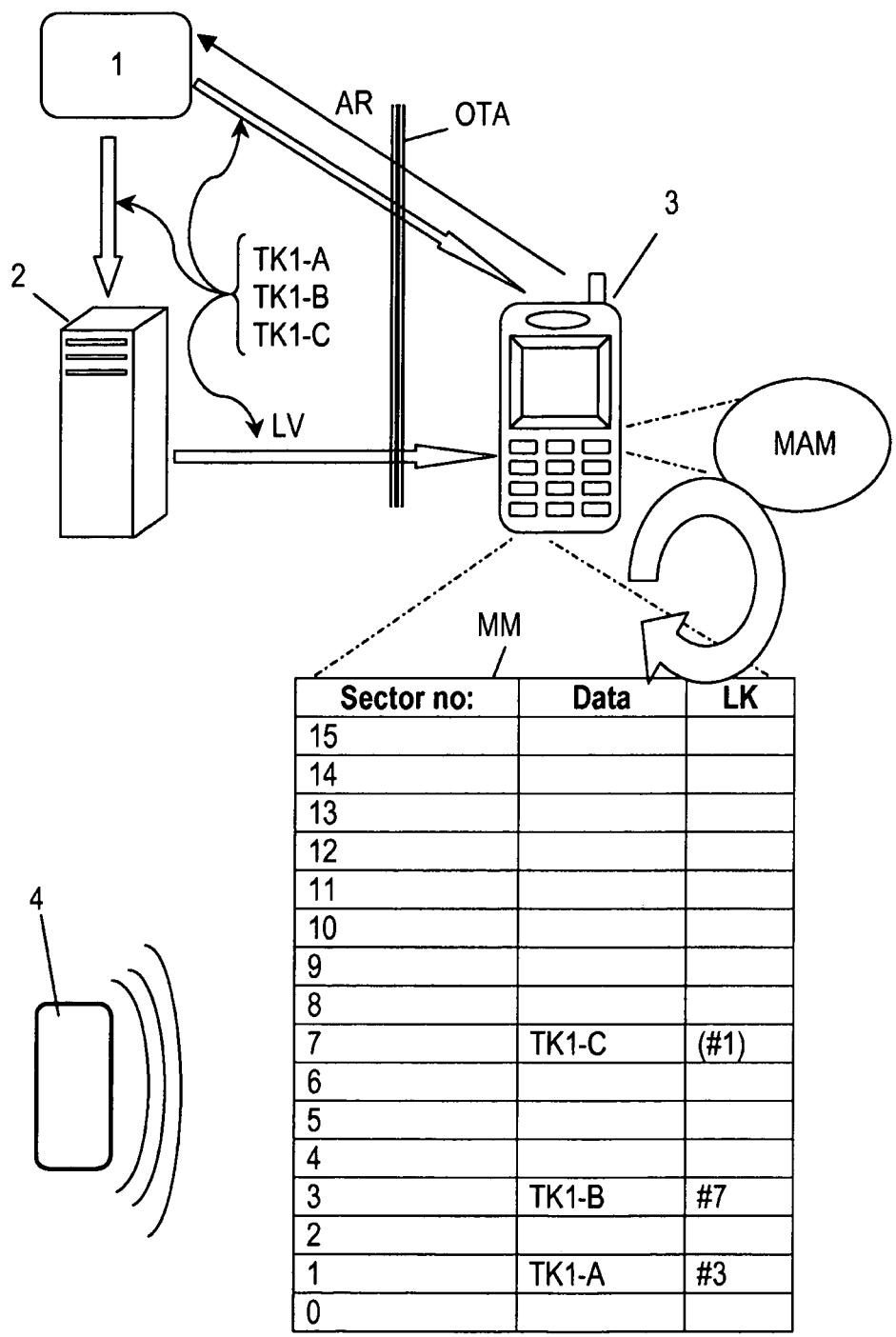
FIG. 4 shows a schematic diagram of a telecommunication system including a mobile communication device with a MIFARE memory.

FIG. 4 shows a schematic diagram of a telecommunication system. The system comprises a service provider 1, a trusted service manager 2 and a mobile communication device 3. It should be observed that the numbers of service providers 1, trusted service managers 2 and mobile communication devices 3 is in no way limited. The service provider 1 communicates with the mobile communication device 3 via the Over-the-Air (OTA) services provided by a mobile network operator, particularly via Short Message Service (SMS) services, and/or via a computer network (HTTP, HTTPS . . . ) and wireless services. NFC terminals for carrying out NFC services may be provided by the mobile network operator. Similarly, the trusted service manager 2 communicates with the mobile communication device 3 via an Over-The-Air service of a mobile network operator, e.g. Short Message Service, HTTP, HTTPS . . . . The service provider 1 communicates with the trusted service manager 2 via a computer network, such as the Internet, wherein the preferred data transmission protocol is HTTPS.

The mobile communication device 3 may e.g. be configured as a NFC mobile phone. The mobile communication device 3 comprises a processor (not shown in the drawing) for executing software being internally stored in the mobile communication device. The software comprises an operating system for carrying out and managing all functions of the mobile communication device 3. The mobile communication device 3 also comprises an internal memory being controlled by the operating system of the device. The mobile communication device 3 further comprises a MIFARE memory MM which is either configured as a MIFARE Classic card (e.g. 1K card) or an emulated MIFARE Classic memory that forms part of a secure element which is a memory device with enhanced security features that comprises its own computational power. Such a secure element is advantageously configured as a SmartMX device. SmartMX devices also comprise encryption coprocessors and enable implementation of operating systems including Java Operating Systems. However, for the present invention it does not matter whether the MIFARE memory MM is a classic card or an emulated card. The mobile communication device 3 further comprises a MIFARE application manager MAM which in the present embodiment of the invention is a software module being generally contained in the software of the mobile communication device 3. The MIFARE application manager MAM has the ability to install MIFARE applications in the MIFARE memory MM, to read MIFARE applications from the MIFARE memory MM and to de-install MIFARE applications from the MIFARE memory MM. MIFARE applications are for instance tickets, coupons, access controls, e-purse functions, etc.

MIFARE applications like tickets TK1-A, TK1-B, TK1-C are either downloaded into the mobile communication device 3 by the service provider 1, e.g. by sending a SMS to the mobile communication device 3 (when configured as a mobile phone), or by means of a NFC reader/writer when the mobile communication device 3 has NFC capabilities and is located within the range of such a NFC reader/writer. Other ways to install MIFARE applications in the communication device 3 comprise for instance HTTP, Https and other data transmission protocols. The downloaded MIFARE applications are handled by the MIFARE application manager MAM. Each time an operation like installing or de-installing a MIFARE application has to be carried out the MIFARE application manager MAM tries to find the best combination of MIFARE applications to be written in the MIFARE memory MM.

Alternatively, MIFARE applications like tickets TK1-A, TK1-B, TK1-C are downloaded into the mobile communication device 3 via a trusted service manager 2. This means that an end-user's request AR to the service provider 1 for a particular MIFARE application like the mentioned tickets TK1-A, TK1-B, TK1-C is processed by the service provider 1 by sending to the trusted service manager 2 the requested MIFARE applications TK1-A, TK1-B, TK1-C together with an identification such as the telephone number of the mobile communication device 3. The trusted service manager 2 transmits the MIFARE applications TK1-A, TK1-B, TK1-C to the specified mobile communication device 3. The trusted service manager 2 also keeps control of the MIFARE memory MM and the MIFARE application manager MAM of the mobile communication device 3. That means that the trusted service manager 2 prescribes in which sectors of the MIFARE memory MM the MIFARE application manager MAM has to install the transmitted MIFARE applications TK1-A, TK1-B, TK1-C.

It is preferred that the trusted service manager 2 is configured as defined in the white paper published by the GSM Association (GSMA) in February 2007. This white paper outlines operator community guidance for the so-called ecosystem parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

One of the key findings in said white paper is that Mobile NFC will be successful provided that the Mobile NFC ecosystem is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

For our further observations it will be assumed that the user of the mobile communication device 3 has bought, i.e requested from the service provider 1 to receive three MIFARE tickets TK1-A, TK1-B, TK1-C on his mobile communication device 3. These tickets are issued for the same event, but have different properties. For instance, the first MIFARE ticket TK1-A is a ticket for an adult in seat category A; the second MIFARE ticket TK1-B is a ticket for an adult in seat category B; and the third MIFARE ticket TK1-c is a ticket for a child in seat category A. Hence, although these three MIFARE tickets are stand-alone MIFARE applications they are linked together in that a reader device 4 is usually pre-configured to retrieve this kind of application (here a ticket for a specific event) from one specific sector of the MIFARE memory MM. However, since that particular memory sector can only contain one of these three tickets the reader device 4 will only retrieve that one that has been installed in this particular sector. The reader device will not be aware that the MIFARE memory contains two further tickets for the same event. Therefore, according to prior art the user—after having presented the first ticket to the reader device 4—would have to manually swap the second and then the third ticket into the specific sector of the MIFARE memory MM which is not acceptable from the point of speed and user convenience. The solution to this problem according to the present invention is to not only install a MIFARE application in a predefined sector of the MIFARE memory, but if that MIFARE application is linked to another MIFARE application, to additionally write link information LK into the sector where the first MIFARE application has been installed. The link information LK comprises a link to the sector where the linked MIFARE application is installed. The link information LK may be configured as a specific memory location in the sectors of the MIFARE memory MM, e.g. the last byte in each sector of the MIFARE memory MM. The reader device 4 when retrieving a MIFARE application from a predefined sector will also read the link information LK of this sector and if it points to another valid sector will read the next MIFARE application from this second sector indicated in the link information and will also read the link information LK of this second sector in order to see whether there is another linked MIFARE application. Writing appropriate values into the link information LK memory locations of the MIFARE memory may either be directly carried out by the MIFARE application manager MAM or may be controlled by the trusted service manager 2 which transmits the MIFARE applications TK1-A, TK1-B, TK1-C together with link information values LV to the MIFARE application manager MAM which will then install the MIFARE applications TK1-A, TK1-B, TK1-C in the sectors prescribed by the trusted service manager 2 and will also write the correct link information values LV into the link information LK memory locations of those sectors. Since present reader devices usually start retrieving MIFARE applications from a specific sector of a MIFARE memory MM the link information LK of the last one of the linked MIFARE application does not need to contain a link to another one of the linked MIFARE applications. However, to comply with random access readers it is preferred to let the link information LK of the last linked MIFARE application point to the first one of the linked MIFARE applications. Then it does not matter which MIFARE application is first retrieved by the reader device 4.

For a better understanding the principles of the present invention will now be illustrated by way of the following example: As assumed above the user of the mobile communication device has bought three different MIFARE tickets TK1-A, TK1-B, TK1-C for the same event such as a soccer game. Each of the MIFARE tickets should be installed in sector 1 of the MIFARE memory MM, since this is the pre-defined sector for this kind of MIFARE application. But, as will be appreciated, only one MIFARE ticket, namely ticket TK1-A can be installed in sector 1. Therefore, the MIFARE application manager MAM installs the second ticket TK1-B in free sector 3 of the MIFARE memory MM and writes the value #3 into the link information LK of sector 1 so that the reader device 4 can detect that the second ticket TK1-B is to be found in sector 3. Next, the MIFARE application manager MAM installs the third ticket TK1-C in free sector 7 of the MIFARE memory MM and writes the value #7 into the link information LK of sector 3 so that the reader device 4 can detect that the third ticket TK1-C is to be found in sector 7. Optionally, the MIFARE application manager MAM writes the value #1 into the link information LK of sector 7 so that the reader device 4 (when being configured as a random access reader) can detect that the first ticket TK1-A is to be found in sector 1 of the MIFARE memory MM. When arriving at the stadium gate on the day of the soccer game, the user swipes his mobile communication device 3 containing the MIFARE memory MM to the reader device 4 at the stadium gate. The reader device 4 then reads the first ticket TK1-A (please note that the reader device 4 is pre-configured to retrieve tickets for this event from sector 1) and follows the link information LK to the second ticket TK1-B located in sector 3. It reads the ticket TK1-B at sector 3 and follows the link information LK to sector 7. From sector 7 it retrieves the last ticket TK1-C. During the entire procedure the user does not have to perform any manual application swapping operations. Reading these three tickets TK1-A, TK1-B, TK1-C has been done as fast as possible for this kind of technology. Now, three users can pass the stadium gate.

Main focus market for the present invention is the OTA (Over the Air) provisioning of new services like ticketing, transit, access control and so on, especially when speed of access is very important (less than 150 ms for transit, less than 300 ms for stadium). It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for installing linked MIFARE applications in a MIFARE memory being configured as a MIFARE Classic card or an emulated MIFARE Classic memory, the method comprising storing the first linked MIFARE application in a first free sector of the MIFARE memory, storing the second linked MIFARE application in a second free sector of the MIFARE memory and writing link information indicating this second sector in a link information memory location of the first sector where first linked MIFARE application has been stored, and repeating the steps of storing linked MIFARE applications and writing link information until the last linked MIFARE application has been stored.

2. The method as claimed in claim 1, wherein in a link information memory location of the sector of the MIFARE memory where the last linked MIFARE application has been stored link information is written indicating the sector where the first linked MIFARE application has been stored.

3. A computer program product being directly loadable into the memory of a mobile communication device that comprises a MIFARE memory being configured as a MIFARE Classic card or an emulated MIFARE Classic memory, wherein the computer program product comprises software code portions for performing—when running on the mobile communication device—the steps of the method as claimed in claim 1.

4. A computer program product as claimed in claim 3, wherein the computer program product is stored on a computer readable medium or is downloadable from a remote server via a communication network.

5. A mobile communication device with an arithmetic-logic unit and a memory, wherein the mobile communication device is adapted to process the computer program product as claimed in claim 3.

6. The mobile communication device as claimed in claim 5, being configured as a mobile phone, having NFC capabilities.

7. A MIFARE memory device being configured as a MIFARE Classic card or an emulated MIFARE Classic memory, comprising in each of its sectors link information memory locations dedicated to being written with link information that indicates another sector where a linked MIFARE application is installed.

8. A trusted service manager being configured to transmit linked MIFARE applications and link information values via an Over-The-Air interface to a mobile communication device that is equipped with a MIFARE memory being configured as a MIFARE Classic card or an emulated MIFARE Classic memory, wherein the trusted service manager is adapted to instruct the mobile communication device on basis of the transmitted linked MIFARE applications and link information values to store the first linked MIFARE application in a first free sector of the MIFARE memory, to store the second linked MIFARE application in a second free sector of the MIFARE memory and to write link information indicating this second sector in a link information memory location of the sector where first linked MIFARE application has been stored, and to repeat the steps of storing linked MIFARE applications and writing link information until the last linked MIFARE application has been stored.

9. A reader device for retrieving MIFARE applications from a MIFARE memory that is configured as a MIFARE Classic card or an emulated MIFARE Classic memory, wherein the reader is configured to read a first MIFARE application from a first sector of the MIFARE memory, which first sector is optionally a predefined sector, reading link information from the same sector, if the link information points to another sector of the MIFARE memory reading the MIFARE application being stored in this another sector, and repeating the steps of reading MIFARE applications and link information until the link information points to an empty or invalid sector or contains a stop instruction or points to a sector that has already been read.

\* \* \* \* \*